(No Model.)

L. R. OAKES.
MILK COOLER.

No. 370,968.  Patented Oct. 4, 1887.

Witnesses,
L. F. Mann,
Frederick F. Goodwin

Inventor,
Lucian R. Oakes
By Offield Towle & Phelps
Atty's.

UNITED STATES PATENT OFFICE.

LUCIAN R. OAKES, OF VALPARAISO, INDIANA.

MILK-COOLER.

SPECIFICATION forming part of Letters Patent No. 370,963, dated October 4, 1887.

Application filed September 8, 1886. Serial No. 213,033. (No model.)

*To all whom it may concern:*

Be it known that I, LUCIAN R. OAKES, a citizen of the United States, residing at Valparaiso, in the county of Porter and State of Indiana, have invented a new and useful Improvement in Milk-Coolers, which I desire to protect by Letters Patent of the United States, and of which the following is a specification.

As is well-known to dairy-men, it is desirable, both where milk is shipped and where it is used for making butter, to remove from it the animal heat as soon as possible after the milk is taken from the cow, in order in the one case to preserve the milk during transportation and in the other to hasten the separation of the cream. This has heretofore been effected by using specially-constructed cooling-cans for shipping, or by placing the milk in an ice-house or packing it in ice for a while before it is shipped, and by the use of similar expedients where the milk is used for dairy purposes. These specially-constructed shipping-cans are costly, and the means adopted for cooling milk where these cans are not used are both expensive and slow. Where milk is sent to any considerable distance the time for preparing the milk for shipping is so short that it is impracticable to use any cooling process or apparatus hitherto known, and in such cases the expensive cooling-cans have been practical necessities.

It is the object of my invention to devise an apparatus for cooling milk which shall be so rapid in its operation that it can be used under all circumstances and will permit the cooling shipping-cans to be dispensed with, and which shall also be more economical and effective for dairy purposes than any method or means of cooling hitherto devised.

To these ends I have provided a cooling-chamber having a large superficial area and small relative capacity, and the walls whereof are thin. This chamber, which is annular in form, as hereinafter set forth, I inclose internally and externally with ice, and to pass the milk rapidly through it suitable ingress and egress devices to and from the chamber being provided. The form of cooling-chamber which I prefer is formed of two concentric thin metal cylinders of such a relative size that the space between them constituting the cooling-chamber is very narrow, the inner cylinder being filled with ice and the outer cylinder packed in it.

My invention consists, further, in certain features and details of construction, hereinafter fully described, and pointed out in the claims.

Figure 1:
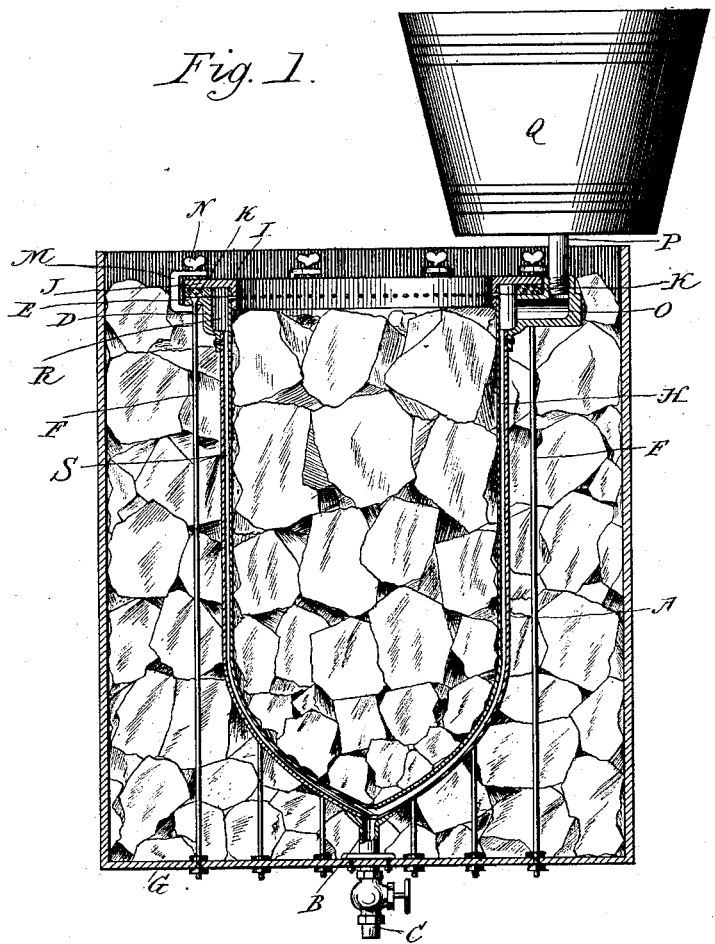
Figure 2:

In the drawings annexed, forming a part of this specification, Figure 1 is a vertical central cross-section of my improved cooler, and Fig. 2 is a detail view of the outside of the inner cylinder.

The outer cylinder, A, is of tin or any other suitable metal, and is preferably made of the shape shown, converging to a point at its lower end, at which point is an opening, B, and attached to the cylinder and connected with this opening is a discharge-faucet, C. The cylinder A has riveted or otherwise attached to its upper edge a circular casting, D, of the shape shown in cross-section in Fig. 1, and having an interior diameter a little larger than that of the cylinder. This casting has a horizontal flange, E, and to this flange are attached, by soldering or other suitable means, a set of vertical rods, F, which pass down below the bottom of the cylinder, and are fixed by double nuts or other suitable device in the bottom of an inclosing receptacle, G, in which the cylinder is placed. The rods F serve both to support the cylinder A and to protect it from the ice which is packed about the cylinder in the receptacle G. It is desirable that the connection between the rods and either the casting D or the bottom of the receptacle should be adjustable, and this is most conveniently effected by screw-threading the lower ends of the rods and using double nuts, as shown. An inner cylinder, H, is placed with the cylinder A, its diameter being such that the space between the two cylinders will be very small. I have found a quarter of an inch to be about the right space in practice. This inner cylinder is of the same shape throughout as the outer cylinder, and is supported by a casting, I, riveted or otherwise attached to it at its upper edge. This casting has also a horizontal flange, J, which projects out over the horizontal flange E of the other casting. Between these two flanges is placed a packing, K, of rubber or other suitable material, to give a tight joint.

The castings are fastened together and a suitable amount of pressure secured by means of clips M and thumb-screws N.

The casting D has at one side a chambered extension, O, in which is screw-threaded a pipe, P, communicating with a receiver, Q, into which the milk is poured, and from which it passes through the pipe P and extension O into the annular chamber R between the two castings, thence into the cooling-chamber S between the two cylinders, and thence out through the faucet C. The two cylinders are packed in ice, as shown, and as the milk passes between them it is effectually cooled. To prevent contact at any point between the inner and outer cylinder and to partially support the weight of the former, I propose to attach to the outside of the inner cylinder or to the inside of the outer cylinder ribs or projections T, as shown in Fig. 2. These may be struck up from the metal itself of the cylinder, or they may be separate strips or pieces soldered or otherwise attached to the cylinder.

Features of my invention to which I desire to call particular attention are the detachable means for connecting the two cylinders, permitting them to be readily separated, so that the surfaces with which the milk comes in contact may be cleaned, and the annular chamber R, from which the liquid is admitted to the cooling-chamber at all points of the circumference of the inner cylinder.

While I have described my apparatus as particularly applicable to the cooling of milk, I do not confine myself to that use of it, it being equally applicable to the cooling of all other liquids.

I claim—

1. In a milk-cooler, the combination of two cylindrical concentric vessels so placed that their walls are in proximity to each other, two castings to which respectively the upper edges of said vessels are attached, the said castings forming a chamber for admitting liquid to the space between the two cylindrical vessels, and supports for one of said castings independent of the said cylindrical vessels, whereby the said vessels are relieved of the weight of the said casting, substantially as set forth.

2. The combination, with the parallel walls of the cooling-chamber S, two supporting-castings shaped so as to form a chamber communicating with said chamber S, each of said castings being attached to one of the said walls of the cooling-chamber, and packing between said castings, clips for holding them together, and supports for said castings independent of the walls of said cooling-chamber.

3. The combination of the cylindrical vessels A and H, the castings D and I, to which said vessels are respectively attached, and clips M, provided with thumb-screws N, for holding said castings together.

4. In a cooler, the combination of the cooling-chamber S, provided with exit-tube B, the annular chamber R, communicating therewith, the chambered extension O, communicating with chamber R, and receiver Q, as and for the purpose set forth.

L. R. OAKES.

Witnesses:
WILLIAM JOHNSTON,
J. C. STEWART.